Dec. 9, 1930. E. PATRONE 1,784,383
TIRE RIM
Filed Nov. 10, 1925 2 Sheets-Sheet 1
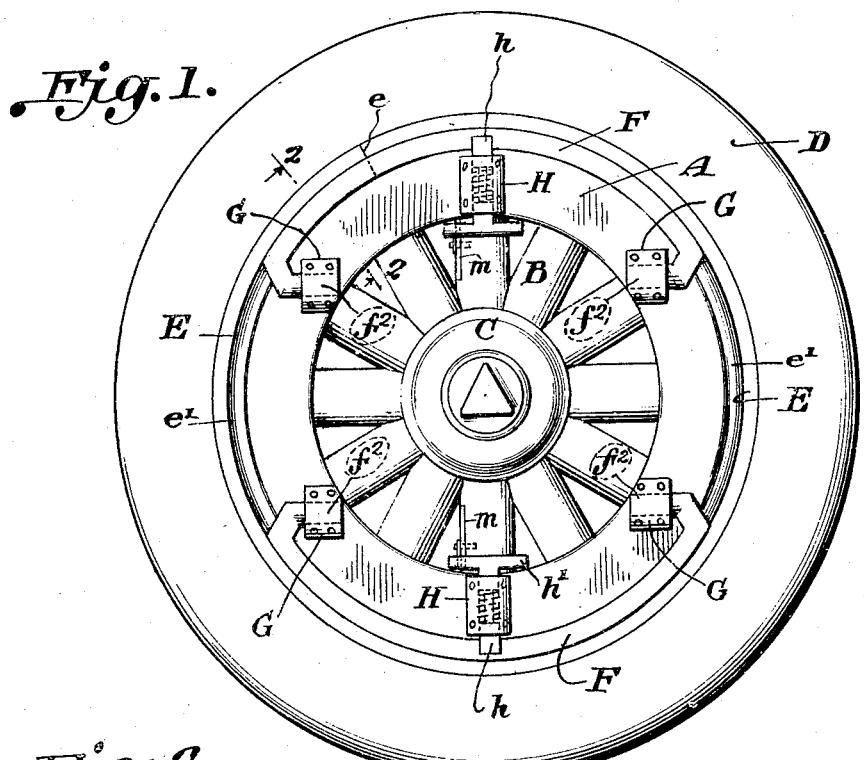
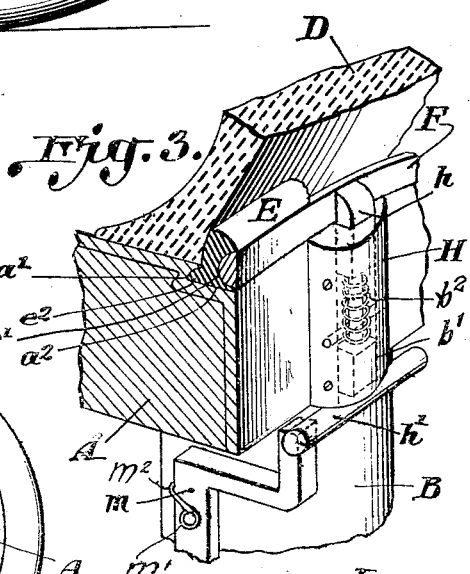
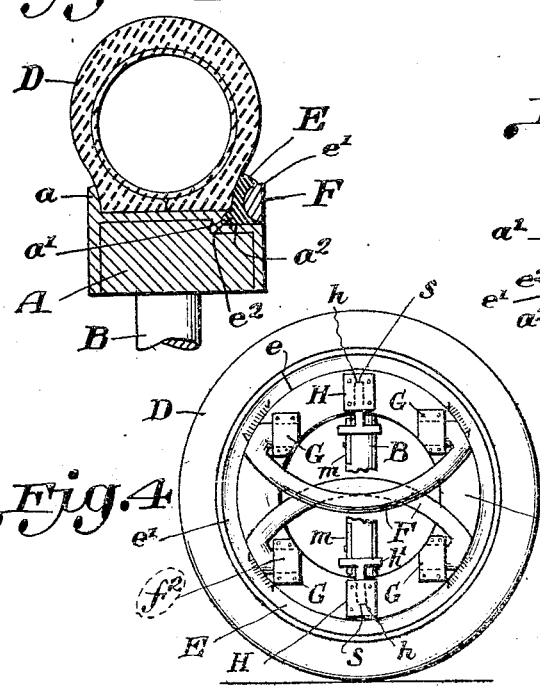
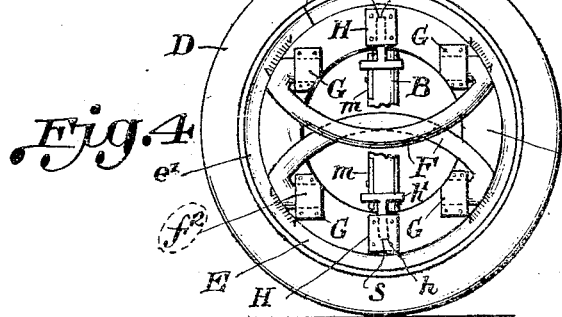
Inventor
Eugene Patrone Dec. 9, 1930.                E. PATRONE                1,784,383
                               TIRE RIM
                       Filed Nov. 10, 1925            2 Sheets-Sheet 2
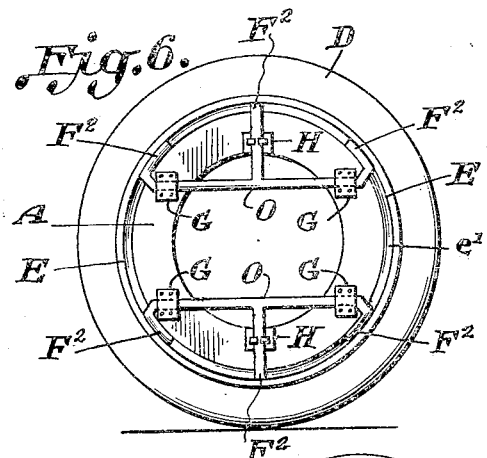
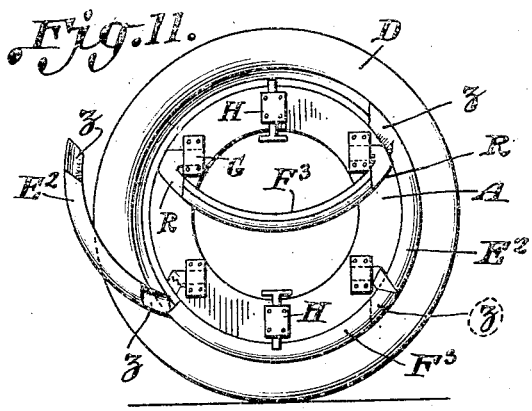
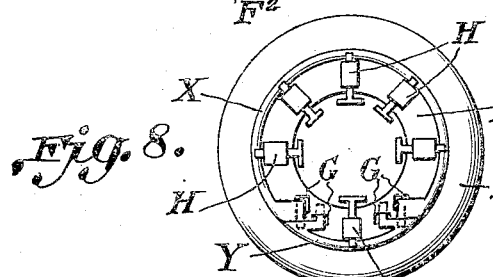
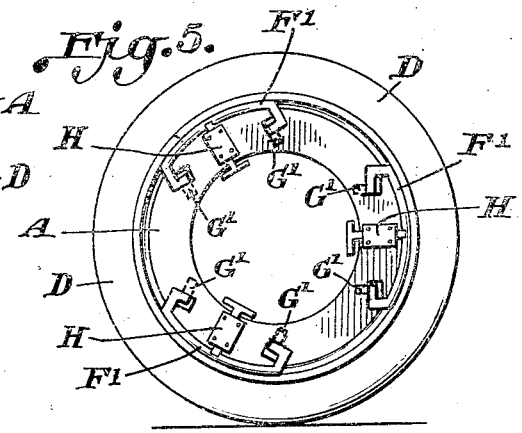
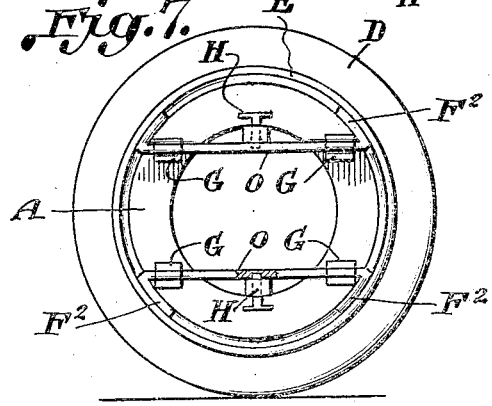
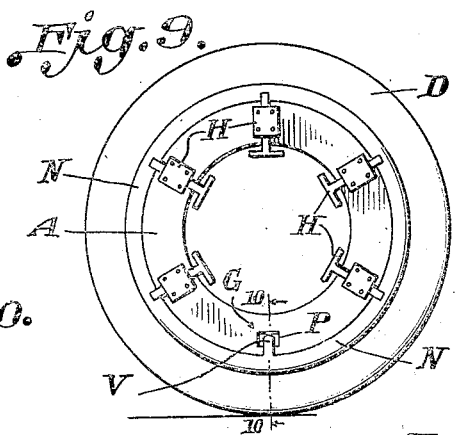
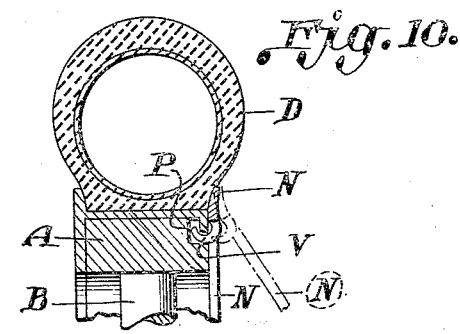
Inventor
Eugene Patrone Patented Dec. 9, 1930

1,784,383

UNITED STATES PATENT OFFICE

EUGENE PATRONE, OF WASHINGTON, DISTRICT OF COLUMBIA

TIRE RIM

Application filed November 10, 1925. Serial No. 68,168.

This invention particularly relates to vehicle wheels on which pneumatic tires are detachably mounted and which tires may be held securely in place on the wheel, or be removed or replaced by adapted devices. According to my invention I equip vehicle wheels with my improvements which are adapted to hold the tires securely in place on the wheel or to release the same from, or reset the same on, the wheel.

I attain this object by the mechanism illustrated in the accompanying drawings, in which—

Figure 1 is a side elevation of a vehicle wheel presenting one of the most convenient forms of my securing device applied;

Figure 2 is a sectional view on line 2—2 of Fig. 1;

Figure 3 is a detail view in perspective showing clearly and on a large scale a portion of the wheel rim, the tire, and the securing devices;

Figure 4 is a side elevation showing fully the devices shown in Fig. 1, but in released position;

Figures 5—6—7—8—9 and 11 are each a particular modification of my device; and

Figure 10 is a sectional view on the line 10—10 of Fig. 9.

Like characters of reference indicate like parts in each of the several views.

Figures 1 to 4 are intended to fully illustrate one specific form of my improvements, while other special forms within the broad feature of my invention are illustrated in other figures of the drawings.

The following descriptions in connection with the accompanying drawings show clearly and concisely the form of construction of my improvements and the related operations which enable one to securely fasten the tire on the wheel or to free the tire.

Referring first to Figs. 1 to 4 of the drawings, the spokes are indicated at B, the hub at C and the tire at D. These parts may be of standard or of any other desirable construction.

The rim A is provided in its inner side with a flange $a$ and on its outer side with a groove $a'$ and a seat $a^2$. The tire D may therefore be forced sidewise on to the rim until its inner side rests against the flange $a$, and then I apply a practically continuous split ring E split at $e$, as shown in Figs. 1 and 4, and shaped with bead $e^2$ on its inner side and with recess $e'$ on its outer side.

Shaped this way the ring E is fully adapted to lie fittingly embraced between the tire D, the groove $a'$ and the seat $a^2$ on the inside, and the two securing devices on the outside. The securing devices F are simple swinging devices. In Figs. 1 and 4 each of the swinging devices is shown as being pivoted at its opposite ends, the pivots $f^2$ being set into bearings G and in between said pivoted ends of the swinging devices locking means or latches H are also shown. As shown in Fig. 3 each of these latches comprises a housing $h'$ adapted to be secured to a wheel felly. In this housing is a bolt member $h$ operated by a coil spring $b^2$ which urges the bolt member $h$ outwardly. The bolt member $h$ has a crosshead $h'$. For each of the latches H there is a member $m$ fastened to a spoke of the wheel by a bolt $m'$ on which bolt is secured the U-shaped spring $m^2$ which tends to rotate the member $m$ in clockwise direction on the bolt $m'$.

In Fig. 4 the swinging devices F and the latches H are shown still in inactive position while the tire D and the ring E are shown already inserted and seated on the wheel in the manner above described. In order, then, to continue the operation, I will now pull on the spring-actuated catches $m$ which, in turn, release the bolt members $h$. Then I swing each swinging device F from its folded position gradually towards the rim A in which operation automatic contact occurs between the swinging device and the bolt member $h$. In this contact bolt member $h$ recedes from the path of the swinging device, but immediately springs back into position again as soon as the contact is over; the device F becomes thus firmly established.

It is then evident that in the course of a single swing a plurality of points along the rim are being connectedly engaged by the swinging device F, until finally the device itself and the respective connections become so fitted with each other as to form a practically solid body with the wheel as a whole.

Having explained the mounting and securing of the tire on the wheel, I will now briefly describe the operation of dismounting the tire. I start by drawing each of the bolt members *h* of Fig. 1 toward the center of the wheel until each of said bolt members *h* is drawn inside its casing as far as *s*, as shown in Fig. 4. That is to say, that bolt *h* is withdrawn far enough toward the hub C so that the handle *h'* will be automatically caught by the spring-actuated catch *m*, as shown in Fig. 4, thus leaving the way clear for the device F to freely swing out from the rim into folded position. The device F having been folded down, the ring E may now be readily removed thus freeing the tire.

It is within my contemplation to also exploit any of the modifications shown in Figs. 5—6—7—8—9 and 11.

Figure 5 is intended to show that a different number of my swinging devices may be applied to a wheel as required. Three of my swinging devices will give a more tenacious and uniform hold than two, but it depends a great deal on the size and the kind of the wheel, whether more or less swinging devices be needed. Here in Fig. 5 these swinging devices are lettered F' being constructed somewhat differently from the devices F in Fig. 1. Here the swinging devices are detachable, the bearings being open bearings G'. In other respects the operation is the same as in Fig. 1, the different construction of bearing and size of bail not causing a structural change, the purpose being to have the bail detachable when convenient.

In Fig. 6 each of the swinging devices shows three individual rim engaging portions F² at spaced intervals substituting the continuous rim engaging portion of the swinging devices F in Fig. 1. This continuous portion F in Fig. 1 makes a continuous external connection with the two pivots *f²*; while in Fig. 6 the continuous connection of the device with the pivots is made internally through the axial portion O. The modification is merely an exchange of arrangement while the essence of my improvement depends on the fact that either arrangement as in Fig. 1 or Fig. 5 includes a swinging device adapted to swing on its axis to associatedly engage a series of points on the rim.

In Fig. 6 I also place the latches H to act in advance of the axis of rotation of the swinging device, i. e.: between the axis of rotation of the device and the portion of the rim engaged by the device. In this way the latches H not only secure the pivoting of the device but also reinforce the rim engaging portion F² in its hold on the rim.

In Fig. 7 is shown a further modification of Fig. 6 itself. Here only two rim engaging portions are shown opposite each other in operation, instead of the three shown in Fig. 5, and this arrangement may be convenient whenever the wheel may need an extra engagement at two opposite points; or whenever the rim of a wheel needs to be secured at a number of points, multiple of two, especially on small light wheels in which there may be a need for the securing means at only four points. This type of swinging device in Fig. 7 is also intended to show the first progressive step between a finger swung member and a swinging device adapted to connectedly engage a series of points along the rim.

Figure 8 is a modified form where one swinging device X is of a size to embrace a great portion of the rim or tire, the remaining portion being closed by a swinging device Y of small size, showing how the bail or swinging device may approach a complete circle, or approach a single contact point, and still retain the essential idea; moreover dispensing with the ring E and completely engaging every portion along the tire.

In Fig. 9 the swinging device is shown as a continuous curved member or ring having a hook V adapted to be inserted in an opening P in the rim A. Latches are also arranged along the rim. In this case as the swinging device or ring N is rotated about the hook V into position, the same is caught at successively advancing points ahead of the pivots and the swinging device is firmly set in position. This modification is intended to make the swinging device adapted to associatedly engage a whole circumference of points along the rim to secure the tire. Also the leverage here is greater; and according to the kind of wheel this swinging device will at times be desirable. The detail structure is shown in Fig. 10.

In Fig. 11 the modification includes a change in the flanging of the rim. In this figure I use two detachable segments E² in place of the continuous ring E used in Fig. 1. One of these detachable segments E² in Fig. 11 is shown removed from active position, while its partner segment is shown with one end *z* already secured by the lower swinging device or bail F³ and its opposite end lying exposed but ready to be engaged by the upper swinging device or bail F³. This exposed end *z* and the corresponding portion R of the swinging device are so sized and shaped as to engage, and fit with, each other when the device is swung into active position. Also the middle portion of the swinging device F³ is now in this case so sized and shaped as to be adapted to engage directly and fittingly with the tire D, the groove *a'* and the seat *a²*. The combined cross section of ring E and bail F shown in Fig. 3 taken as a member by itself, will be the exact cross section of the middle portion of the bail F³ in Fig. 11.

It is evident from the foregoing disclosure that various combinations may be made in arranging the elements of my devices to progress from one form to another, the members being either permanently fixed or detachable and pivoted at one or more points, or used singly or in numbers, all directed to holding the rim or the tire at selected or associated points by the action of each swinging member, all without departing from the spirit of the invention as claimed.

What I claim is:

1. A device for holding a tire on a wheel comprising a curved holding member extending over more than $\frac{1}{7}$ of the periphery of the wheel, pivotally engaged at two opposite ends, the outer extent in toto of the curved holding member being swingable inwardly of the inner periphery of the tire, and locking means engaging the curved holding member between its pivoted ends for securing the curved holding member in operative position.

2. A device for holding a tire on a wheel comprising a plurality of holding members each extending over more than $\frac{1}{7}$ of the periphery of the wheel pivotally engaged at two opposite ends the outer extent in toto of the holding members being swingable inwardly of the inner periphery of the tire, and locking means engaging each holding member between its pivoted ends, for securing each holding member in operative position.

3. A device for holding a tire secured over the peripheral face of a wheel comprising a plurality of holding members having ends pivotally mounted upon the wheel and spaced substantial distances from each other, and means intermediate said end for securing said holding members in operative position, the pivotal mountings of said holding members lying in such spaced relation to each other and holding said ends so closely to the peripheral face of the wheel and with such a force that each of said ends with its corresponding parts of said pivotal mountings is caused to take substantially the place of one of the usual securing bolts.

In testimony whereof I affix my signature.

EUGENE PATRONE.